INVENTOR
HUGO REICHERT

May 22, 1962 H. REICHERT 3,036,270
PULSE PICK-OUT ARRANGEMENT
Filed July 30, 1958 6 Sheets-Sheet 5

INVENTOR
HUGO REICHERT

BY Toulmin & Toulmin
ATTORNEYS

May 22, 1962 H. REICHERT 3,036,270
PULSE PICK-OUT ARRANGEMENT
Filed July 30, 1958 6 Sheets-Sheet 6

INVENTOR
HUGO REICHERT

BY Toulmin & Toulmin
ATTORNEYS

United States Patent Office 3,036,270
Patented May 22, 1962

3,036,270
PULSE PICK-OUT ARRANGEMENT
Hugo Reichert, Wilhelmshaven, Germany, assignor to Olympia Werke A.G., Wilhelmshaven, Germany
Filed July 30, 1958, Ser. No. 752,102
Claims priority, application Germany Sept. 28, 1957
10 Claims. (Cl. 328—34)

The invention relates to an electronic pulse pick-out arrangement which serves to pick-out selectively from a continuously sequence of electrical pulses a determined number of successive pulses and branches the picked-out pulse sequence to an output terminal.

Hitherto, when it became necessary to make certain desired pulse groups available at a predetermined times in order to control the individual operations of electrical acounting or computing machines processing data in the form of electrical pulses, the desired pulse groups must be produced by pulse generators which are in turn set in operation by means of an extraneous starting pulse. Thus, Patent 2,418,521 to Martin et al. describes a pulse measuring device in which an oscillator generates pulses which are converted to a desired shape by pulse deforming means and are then amplified. An electronic counter connected directly to the output of the amplifying means of this known device, counts the pulses and interrupts their their transmission, as soon as the desired number of pulses has been picked out. The known methods of producing pulse groups suffer from the drawback of making the synchronization in correct phase of the group pulses produced by the pulse generator with the working clock pulses of the computing or the like machine very difficult. This fact requires special means for enforcing synchronization in particular when using several pulse generators; furthermore, the instant in which the pulse generator is set in operation for transmission is in no exactly definable time relation to the pulses which the generator itself produces.

As a further drawback, each pulse group required in the computing machine or the like must be produced by a pulse generator of its own, requiring in addition electronic counters which cause an unduly large outlay in tubes, etc., in particular if pulse groups having a high pulse number are required.

It is, therefore, an object of my invention, to provide a pulse pick-out arrangement which permits to pick out pulse groups required for the starting and/or control of individual operations of a computing or the like machine of the described type directly from the clock pulses of the machine itself and make the picked-out pulse groups available to the machine in perfect synchronization with the clock pulses of the latter.

This object is achieved and the above-mentioned drawbacks avoided, by the pulse pick-out arrangement according to my invention, in which a group of pulses from the continuous clock pulse sequence, for instance of a machine of the type described above, is picked out during a determined time interval between two switching pulses having a determined distance in time from each other, and branching off the desired pulse group to an output terminal, where this pulse group is made available. The switching pulses are introduced as a continuous pulse sequence, preferably at a lower frequency than that of the clock pulse sequence, on a channel of the arrangement according to my invention.

According to an important feature of my invention, a single clock pulse sequence is applied to several pick-out arrangements, each of which picks out a determined pulse group, whereby it is guaranteed that all branched-off pulse groups coincide with the clock pulse.

According to another feature of my invention, the switching pulse sequence is in a fixed time relation to the clock pulse sequence.

More particularly, the invention is characterized by a gating arrangement in which a first switching pulse of a single switching pulse sequence following a special starting pulse, given at will, opens the gate and branches off the clock pulses for such time until the next following switching pulse of the aforesaid sequence interrupts the pick-out of the clock pulses, whereupon a later switching pulse of the above-mentioned sequence can only open the gate for branching off another clock pulse sequence after a renewed occurrence of a command for doing so, in the form of another special starting pulse.

Further objects and advantages of the invention will become apparent from the following description thereof in connection with the accompanying drawings, in which FIGURE 1 shows a block diagram of a pulse pick-out device according to the invention;

Figure 1:
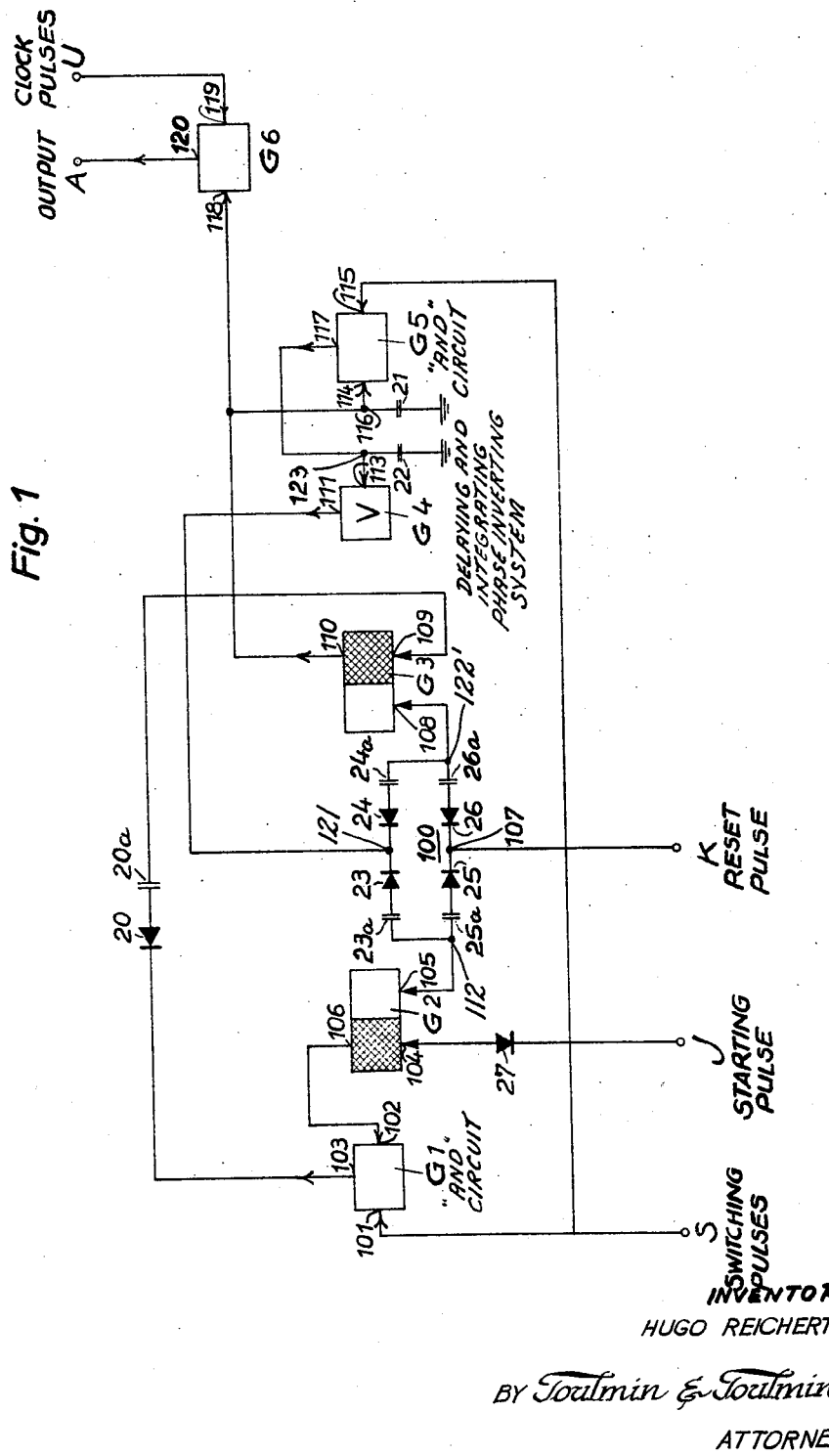

Referring now to the drawings in detail, the block diagram shows the arrangement of six main circuit elements indicated by boxes G1, G2, G3, G4, G5, and G6, which together constitute a preferred arrangement of the pulse pick-out device according to the invention. Each of boxes G1, G5 and G6 represents an "and" circuit. "And" circuits are described, for instance, in "High Speed Computing Devices" (HSCD) (1950), pages 37 to 43, published by McGraw-Hill Book Company. G2 and G3 are reversible elements, i.e., each is an electrical circuit element in an arrangement which can be reversed between two different states, one being the inoperative and the other the operative state in the present arrangement.

Such elements are described, for instance, in HSCD, supra, pages 13 and 29. Any one of the and-circuits and reversible circuits described in HSCD, supra, is suitable for use in the arrangement according to the invention or can be easily adapted by one skilled in the art, for such use. The latter comprises five terminals:

U for the supply of continuous clock pulses,

J for the introduction of a pick-out starting pulse (command pulse),

S for the introduction of switching pulses,

K for receiving a clearance (or restoring) pulse, and

A as an exit for the picked-out pulse groups.

The first and-circuit, element G1, is provided with three main connecting points 101, 102, and 103; element G2 with three connecting points 104, 105, and 106; element G3 with three connecting points 108, 109, and 110; G4 with 111 and 113; G5 with 114, 115 and 117; and finally G6 with 118, 119, and 120.

Terminal S is connected to 101 and, in parallel thereto, to 115. Terminal J is connected via rectifier 27 to point 104 of element G2. The latter serves as an intermediary reversible element, G6 is the main output control gate while G4 in cooperation with a capacitor 22 serves as a delaying and integrating phase inverting system.

Rectifier bridge system 100 comprising rectifiers 23, 24, 25, 26 and capacitors 23a, 24a, 25a, 26a, is connected via four points 107, 112, 121, and 122 to the other parts of the arrangement of FIGURE 1. Thus, point 107 is connected to terminal K, which may in turn be connected to an automatically or manually operable switch key.

Point 102 of G1 is connected to 106 of G2, 103 of G1 via rectifier 20 and capacitor 20a to 109 of G3, 105 of G2 to 112 of rectifier system 100, 121 of the latter to 111 of G4, 122 of system 100 to 108 of G3, 110 of G3 to input 118 of G6 on the one hand, and to 114 of G5, via point 116, on the other hand. Point 117 of G5 is connected in a similar manner to 113 of G4 via point 123. Points 116 and 123 are connected to ground each via a capacitance 21, 22 respectively.

The arrangement shown in FIGURE 1 functions in the following manner:

The gate element G6, which is devised as a logical "and" circuit, always picks out pulses and/or pulse sequences from the continuous clock pulses applied to its input point 119 from terminal U, and branches them off through output 120 to terminal A, when a positive voltage is applied to input 118 thereof. This positive voltage is derived from reversible element G3, which is controlled by the switching pulses which are continuously applied from terminal S via "and" circuit element G1. The same switching pulses are also applied to the "and" circuit G5. Further functioning will also be explained hereinafter with the aid of the pulse plan shown in FIGURE 3. It will be apparent, that the three "and" or gating elements G1, G5, G6 each have an input terminal for pulses to be gated, an output terminal for pulses having been gated and a gating terminal for controlling the passage of pulses from input to output terminal thereof.

In the initial electrical state of the arrangement, a negative potential is applied at input points 102 of G1, 114 of G5, and 118 of G6. This is shown by negative amplitudes relative to the time axes 4, 9, and 12 in FIGURE 3. Consequently, the switching pulses applied from terminal S to G1 and G5, and the clock pulses applied from U to point 119, remain ineffective. Reversible elements G2 and G3 are in their inoperative state, and since elements G1, G5, and G6 are non-conducting, the entire device is still in its inoperative state.

Only when the starting key at J is actuated, for instance by manual depression, a negative potential appears at J (at the time $t_1$ on time axis 15 in FIGURE 3) and is applied at 104 of reversible element G2, whereby the latter is reversed to adopt its operative state. Thereby, a positive potential is applied to input point 102 of element G1, at the time $t_1$ on time axis 4 of FIGURE 3, where- upon the next following pulse $s_1$ at time $t_3$ on time axis 2 in FIGURE 3) of the posiitve switching pulse sequence applied continuously at terminal S, is applied at 101 of G1 (axis 3 of FIGURE 3) and causes element G1 to become operative and cause a negative pulse to appear at exit point 103 (axis 5 of FIGURE 3), and therewith via rectifier 20 at point 109 of reversible element G3, thus reversing the latter to its operative state. This leads in turn to the appearance of a positive potential at exit point 110 of G3 and therewith at input point 118 of gate element G6 (at time $t_3$ on time axis 12 of FIGURE 3) so that the latter begins picking out a group of pulses from the clock pulse sequence applied at U and branches the picked out group off through 120 toward exit terminal A.

At the same time, the positive potential of point 110 of G3 is also applied to point 116. However, due to the charging of capacitor 21, the potential at input point 114 of element G5 rises only gradually, so that the aforementioned first switching pulse of the pulse sequence from terminal S does not yet influence element G5, although positive potential is already applied at 115 (axis 10 in FIGURE 3). This is illustrated by a slow rise of the potential amplitude relative to the time axis 9 in FIGURE 3.

Figure 3:
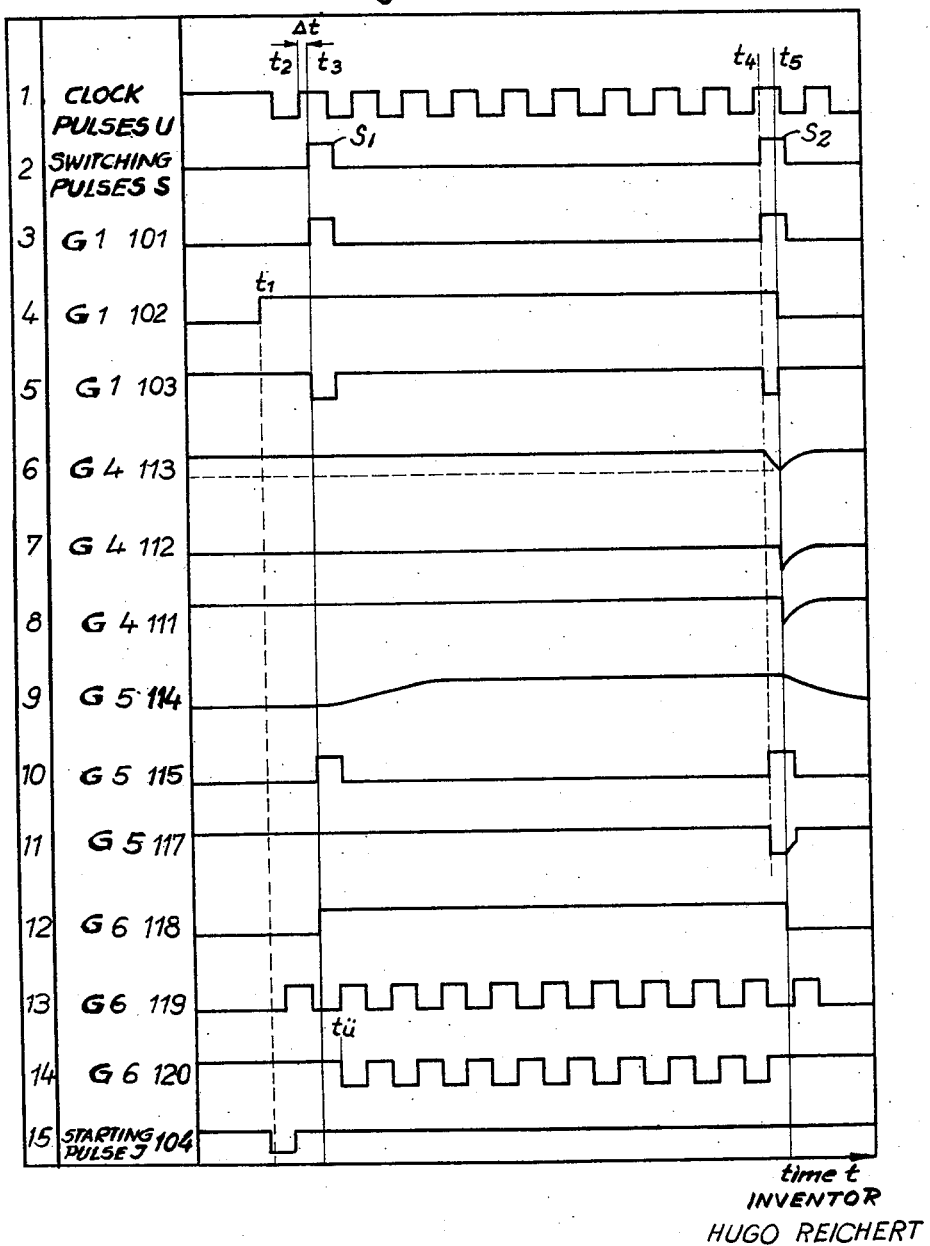
FIGURE 3 shows graphically a pulse plan plotted against time.

When the next following switching pulse $s_2$ of the switching pulse sequence applied to terminal S occurs at the time $t_4$, on time axis 2 of FIGURE 3, and consequently at input points 101 of G1 and 115 of G5 (time axes 3 and 10 in FIGURE 3), the other input points of these elements, namely point 102 of G1 and 114 of G5, are already at positive potential, as shown on axes 4 and 9 in FIGURE 3, so that each of these "and" circuits (G1 and G5) now emits a negative pulse at exit point 103 and 117 respectively, as shown at time $t_4$ on time axes 5 and 11 in FIGURE 3. The negative output pulse at point 103 of element G1 remains ineffective since reversible element G3 is already in its operative state.

The negative output pulse at 117 of element G5, however, is integratingly delayed due to the gradual charging of capacitor 22 before its appearance at 113 of pulse-transforming element G4 (time $t_5$ of time axis 6 in FIGURE 3); this pulse appears again as a negative pulse at exit point 111 of G4 and resets the two reversible elements G2 and G3 via point 121, and points 112 and 122' respectively, of bridge system 100, to their inoperative state.

The negative output potential at point 110 of G3 is also applied at 118, at time $t_5$ on axis 12 of gate element G6, whereby the picking out and branching off of clock pulses is immediately interrupted, while the negative output potential applied at 106 of G2 and at 102 of G1 prevents a new switching pulse from exciting element G1 to conduct. The branching off of clock pulses is therefore terminated.

A subsequent pick-out of another group of clock pulses can only be initiated by a new starting pulse, appearing at a later time on time axis 15 of FIGURE 3. Such a new starting pulse would reverse element G2 again to its operative state.

Figure 2:
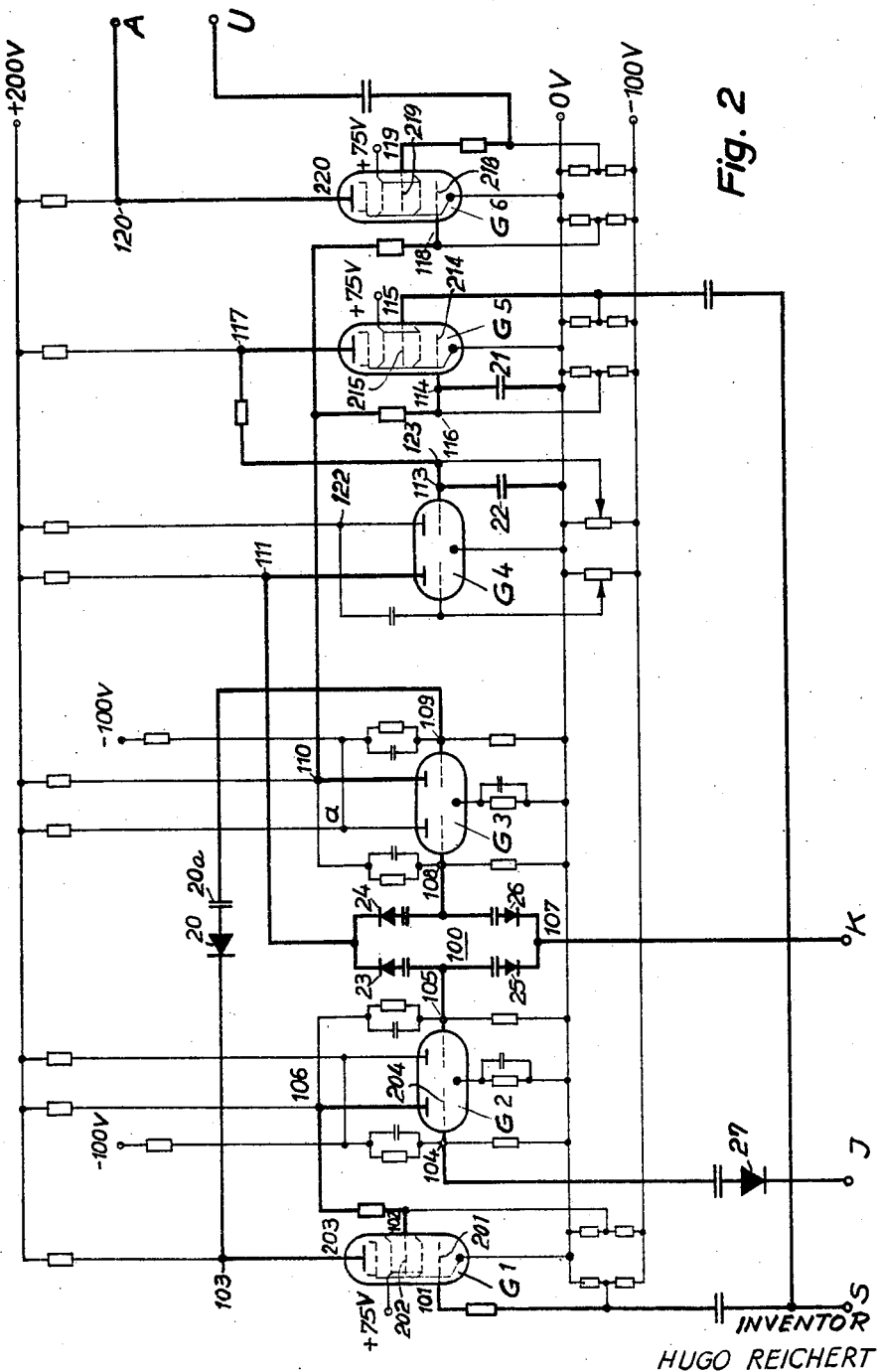
FIGURE 2 is a wiring diagram showing in detail one embodiment, by way of example, of the pulse pick-out device shown in the block diagram of FIGURE 1.

In the embodiment of the pulse pick-out device according to the invention, illustrated in FIGURE 2, the "and" circuit elements G1, G5, and G6 are constituted by pentodes, whereof G1 has the grids 201 and 202, and the anode plate 203; G5 has grids 214 and 215 and anode plate 217; and G6 has grids 218 and 219, and anode plate 220. The reversible elements G2 and G3 are constituted by ordinary flip-flop double triodes, and the delaying element G4 is constituted by another double triode.

Like parts in FIGURES 1 and 2 are designated by the same reference numerals.

The operation of this arrangement corresponds to the general explanation given in regard to FIGURE 1.

The inoperative state of the device has already been described above in connection with the latter figure.

When the starting key is actuated either automatically or manually, at a given time $t_1$, a negative pulse is applied to terminal J, whereby the grid potential of grid 204 blocks the left-hand system in the flip-flop double triode of G2. The latter element is thereby reversed into operative state, with a consequent rise in the potential at 106. The same rise in potential occurs at 102 and on grid 202 of G1 (time axis 4 of FIGURE 3), whereby G1 is primed for transducing a switching pulse from the pulse sequence at S.

Now, whenever the next pulse of that switching pulse sequence (axes 2 and 3 in FIGURE 3) arrives via S at the grid 201, the pentode constituting the essential element in G1 becomes conductive. Thereby, its anode potential at 103 decreases for the duration of the switching pulse ($s_1$ on axis 5 in FIGURE 3). This negative pulse lowers the potential at 109 of flip-flop G3, the latter element is reversed into its operative state, and consequently the potential at 118, i.e. at the first grid of pentode G6, rises (time axis 12 in FIGURE 3). Tube G6 is thus made conductive and transduces the clock pulses applied at its second control grid, connected at point 119 from the latter grid to the anode 220, and from there to terminal A (time axes 13 and 14 of FIGURE 3).

The high potential at 110 on the right side of flip-flop G2 also prevails at point 114 and can only build up gradually on grid 214 of pentode G5 due to the gradual charging of capacitor 21 (time axes 9 in FIGURE 3). The first switching pulse from S after the starting pulse from J, which is applied at grid 215 of pentode G5 (axis 10 in FIGURE 3), can therefore not make G5 conductive (axes 11 in FIGURE 3). The branching of clock pulses from U to A then takes place until a second pulse $s_2$ of the switching pulse sequence from S makes the arrangement inoperative.

This is effected in the following manner:

The aforementioned second switching pulse $s_2$ from S is received at the grid 201 of G1 at the time $t_4$ (on time axis 3 in FIGURE 3) and simultaneously at the grid 215 of G5 (axis 10 in FIGURE 3).

Grid G1 then produces at its anode 203 a negative pulse (axis 5 in FIGURE 3), which remains, however, ineffective, since the potential on the left-hand grid at 109 in flip-flop G3 is already negative.

Now, a negative pulse also appears at the anode of G5 and consequently at point 117 (axis 11 in FIGURE 3), which pulse is integrated at the right-hand grid, at 113, of the double triode in element G4 by means of capacitor 22 (during the time from $t_4$ to $t_5$ on time axis 6 in FIGURE 3). The anode potential of the double triode at point 122 suddenly rises at $t_5$ (axis 7 of FIGURE 3) while the potential at point 111 suddenly decreases and emits a negative pulse (axis 8, FIGURE 3). This negative pulse appears at both diode rectifiers 23 and 24 and reverses the flip-flops G2 and G3 from their operative state back to their initial inoperative state. The negative potential at point 110 of the flip-flop element G3 decreases the potential of grid 218 of pentode G6, whereby the passage of clock pulses through G6 is interrupted.

Furthermore, the decreasing potential at 110 of flip-flop G3 is again integrated, prior to arriving at grid 214 of G5, by means of capacitor 21, whereby the potential at the said grid 214 slowly decreases (axes 9 in FIGURE 3). The anode voltage at 117, which shows a pronounced drop at the time $t_4$ due to the arrival of the switching pulse $s_2$ from S on grid 215, now rises reciprocally proportionate to the decreasing grid potential at 214, after time $t_5$ (axes 11 in FIGURE 3). A similar rise occurs in the potential at point 113 and the grid of the double triode in G4 connected to that point (axis 6 in FIGURE 3) whereby the anode voltages at 111 and 122 change in the manner illustrated on axes 7 and 8 of FIGURE 3.

The decreasing potential at 106 in flip-flop element G2 also decreases the potential at grid 202 of G1 and blocks the pentode G1. Thereby, the initial inoperative state of the entire arrangement is re-established, and subsequent switching pulses from S cannot set the pulse pick-out device into operation. This can only be done by renewed actuation of the starting key and the resulting reversal of flip-flop G2 when the new starting pulse arrives at grid 204 thereof, thus starting a new pick-out and branching of a clock pulse sequence from U to A.

Figure 4:
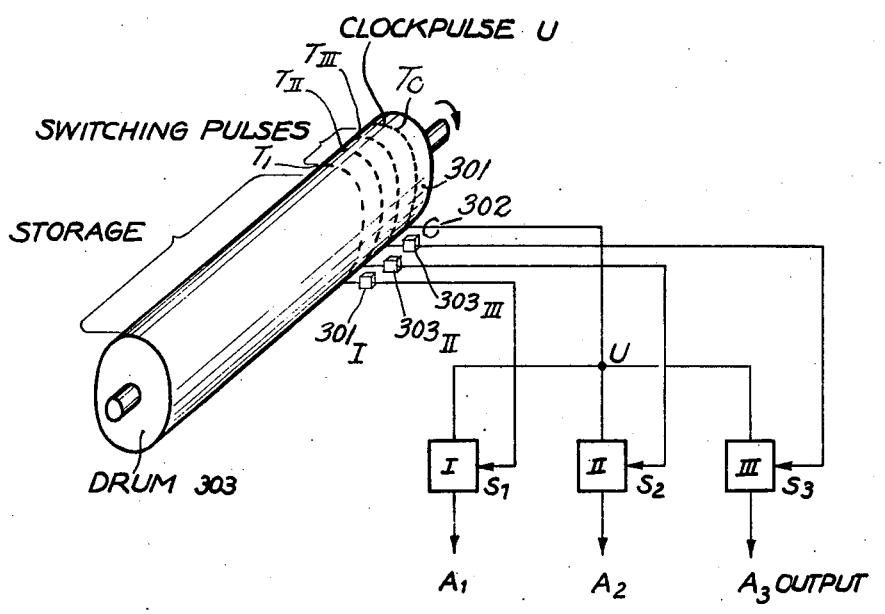
FIGURE 4 is a schematic view of a pulse-originating memory member of a known computing machine or the like and shows the connections of said member with three parallely disposed pulse pick-out devices according to my invention.

The clock pulses applied at U may be derived from a magnetic storage drum 300, as illustrated schematically in FIGURE 4, on the cylindrical surface 301 of which drum they are recorded as magnetizations in track $T_c$. During the rotation of the drum, the clock pulses are read out in a conventional manner with the aid of a reading head 302 by which they are transmitted to U.

The switching pulses may be derived from recordings made, for instance, on the magnetizable surface 301 of the same drum 300 in one or several tracks $T_I$, $T_{II}$, and $T_{III}$ parallel to the clock pulse track $T_c$. Each switching pulse track is scanned by a separate switching pulse reading head $303_I$, $303_{II}$, or $303_{III}$ and the switching pulse thereby transmitted to terminal S (FIGURE 1).

It is important for the proper functioning of the arrangement according to my invention, that the switching pulses from S appear with their front slopes at a well defined time $t_3$ in an interval between two clock pulses, for instance as shown on axes 1 and 2 of FIGURE 3, where the switching pulse $s_1$ appears with its front slope by a time interval $\Delta t$ after the tail slope, at the time $t_2$ of the preceding clock pulse.

Figure 4A:
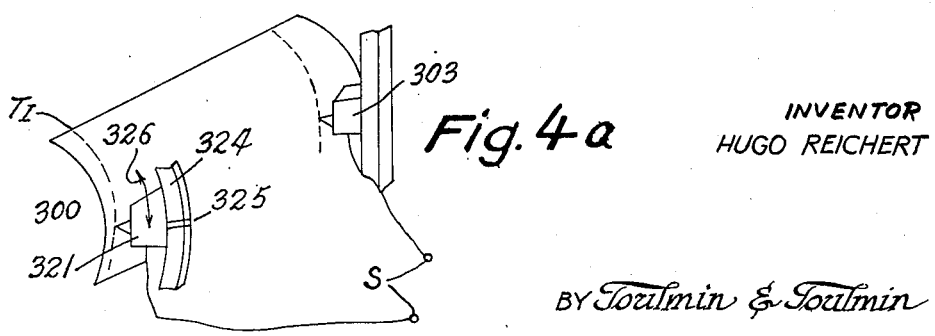
FIGURE 4a is a schematic view of a portion of the magnetic cylinder and illustrating the switch pulse reading heads.

The exact adjustment in time of the clock pulses and the switching pulses relative to each other is achieved by adjusting means which are connected with the switch pulse reading head or heads, as shown in FIGURE 4a. As shown in this figure, the reading head, for instance 321, is displaceable in its mounting 324 and can be arrested in various positions in the latter by fastening means such as holding screw 325.

As indicated by arrow 326, a slight displacement of the reading head in either direction will mean a change in the time interval between the reading of the clock pulses by the stationary reading head 303 and the reading of the switching pulses by reading head 321,.

By this adjustment of the switching and clock pulses relative to each other, it is insured that the branching of the clock pulses will alawys take place at an exactly defined time $t_u$ (axes 14 in FIGURE 3), while the starting pulse may be introduced at T at any desired moment.

The number of clock pulses contained in the clock pulse sequence to be picked out and branched off from U to A in the arrangement according to my invention, is determined by the distance in time between two successive switching pulses from S. Thus, in FIGURE 3, the number of clock pulses picked out from axis 1 is determined by the time interval between the switching pulses $s_1$ and $s_2$, i.e., between times $t_3$ and $t_4$ and, depending on the frequency of the clock pulses, is, for instance, nine as shown on axis 14 of FIGURE 3. By varying the interval between $s_1$ and $s_2$, the length of the pulse groups to be picked out and consequently the number of clock pulses in a picked-out group can be varied at will.

The aforesaid interval between successive switching pulses is determined by the recording in the corresponding track on the storage drum, and a change in the interval, and thereby in the number of clock pulses picked out between two successive switching pulses and made available by a given pick-out unit, can therefore be effected by shifting the reading head of the unit to scan a different track on the storage drum, on which the switching pulses are spaced by the desired new interval.

Prior to starting the pulse pick-out device according to my invention, return of the same to its initial inoperative state can be assured, automatically or manually, by actuation of a reset key connected to terminal K. By actuating the clearance key, a negative potential is applied at point 107, whereby the flip-flop elements G2 and G3 are brought into inoperative state via rectifiers 25 and 26 in the same manner as this is achieved by a reset pulse from flip-flop G4 via point 111 and rectifiers 23 and 24.

Figure 5:
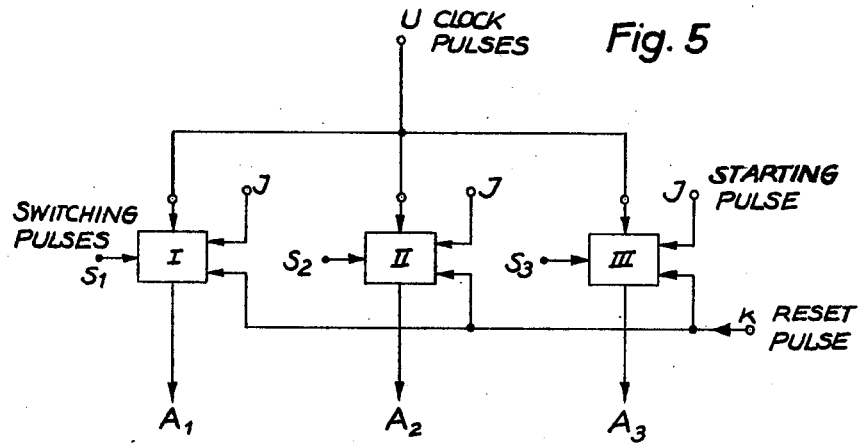
FIGURE 5 shows one particular electrical arrangement of the three pulse pick-out devices shown in FIGURE 4.
Figure 6:
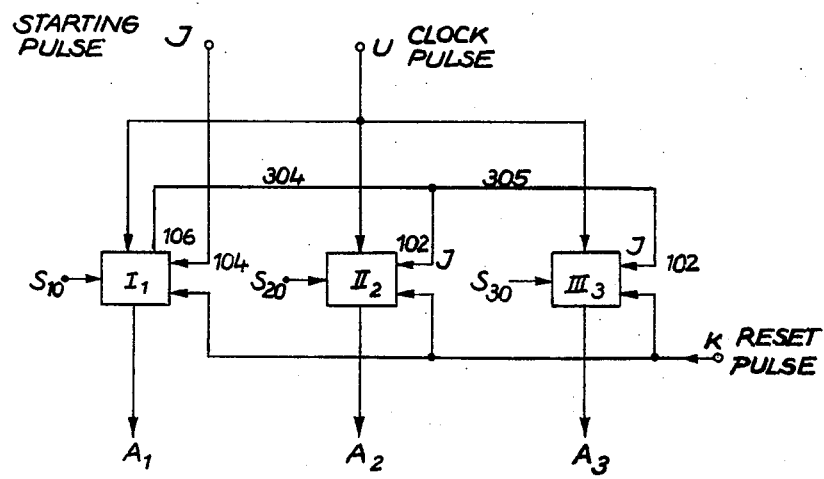
FIGURE 6 shows another arrangement of the three pulse pick-out devices.

As shown schematically in FIGURES 4–6, several pulse pick-out devices, each adapted for picking out a pulse sequence of different length may be arranged in parallel connection. The required switching pulse sequences can be recorded in different parallel tracks, for instance $T_I$, $T_{II}$, and $T_{III}$ on drum 300. Of course, the clock pulse tracks and the different switching pulse tracks may also be provided each on a different recording means, for instance, several magnetic storage drums rotated synchronously.

In order to permit correct time interval adjustment between each of the switching pulse sequences and the clock pulse sequence, each of the switching pulse reading heads must be mounted adjustably in the manner described in connection with FIGURE 4a above.

The switching pulse sequence read by one of the heads $303_I$, $303_{II}$, and $303_{III}$ is thus transmitted to the corresponding terminal $S_I$, $S_{II}$, $S_{III}$ of pick-out units I, II, and III, while the clock pulse is transmitted to the common input terminal U of the three units. Each of units I, II and III consists of the circuitry illustrated in FIGURES 1 and 2.

Figure 5A:
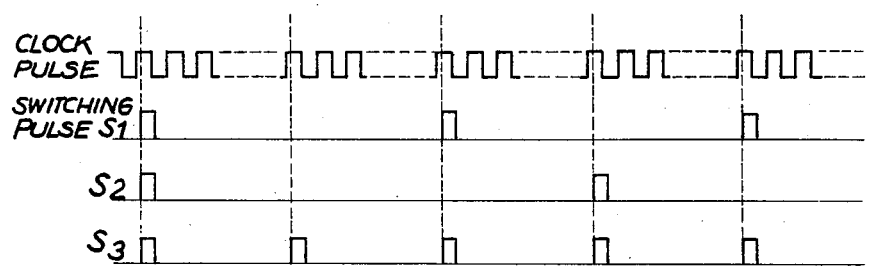
FIGURE 5a is a pulse plan illustrating the operation of the arrangement shown in FIGURE 5.

One mode of arranging several pick-out units in a combined device according to the invention is illustrated in FIGURE 5 and the corresponding pulse diagram in FIGURE 5a.

In FIGURE 5, the three units I, II and III are connected to the common input terminal U for receiving clock pulses, and each unit receives a different switching pulse sequence via its terminal $S_I$, $S_{II}$, or $S_{III}$, respectively.

Each unit is also controlled by its own starting pulse applied at terminal $T_I$, $T_{II}$ or $T_{III}$, respectively.

Depending on the occurrence of the latter pulses, pulse groups $P_1$, $P_2$ and $P_3$ are picked out from the clock pulse sequence and transmitted via outputs $A_I$, $A_{II}$ and $A_{III}$, respectively, as illustrated in the pulse diagram of FIGURE 5a, the length of which groups is determined by the different intervals between the switching pulses applied at $S_I$, $S_{II}$ and $S_{III}$.

Figure 6A:
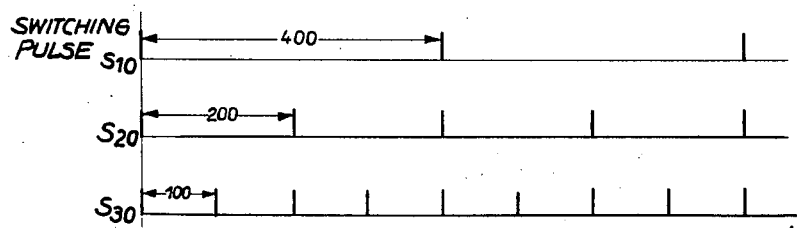
FIGURE 6a is a pulse plan illustrating a part of the arrangement shown in FIGURE 6.

Another mode of arranging pick-out units X, XX and XXX in parallel connection is illustrated in FIGURE 6 and the corresponding pulse diagram in FIGURE 6a.

In this arrangement, the units are connected with each other by common clock pulse input terminal U, as in the embodiment of FIGURE 5, and further by a single starting pulse input terminal T connected to point 104 of unit X (corresponding to point 104 in FIGURE 2), while the other units receive the resulting pulse produced at point 106 of unit X via line 304 at point 102 of unit XX, and via line 305 at point 102 of unit XXX.

Thereby, the starting pulse which is produced with the aid of a manually operable key or a corresponding machine releasing device, effects simultaneously the operation of all three (or more) pick-out units X, XX and XXX.

Consequently, the combined pick-out arrangement starts simultaneously transmission of pulse groups of different lengths through output terminals A, $A_2$ and $A_3$ of FIGURE 6, as illustrated in FIGURE 6a.

For instance, the switching pulses received at input terminal $S_{10}$ of unit X may be spaced from each other by four hundred clock pulses, those received at input terminal $S_{20}$ of unit XX by two hundred clock pulses, and those received at terminal $S_{30}$ of unit XXX by one hundred clock pulses.

The unit assemblies illustrated in FIGURES 5 and 6 can be reset for a new pick-out operation by means of a reset pulse applied through terminal K.

Figure 7:
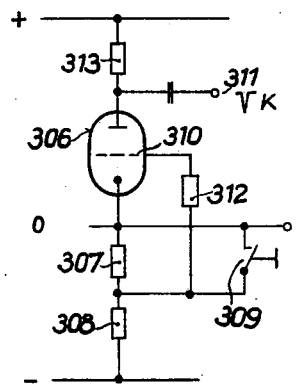
FIGURE 7 shows a wiring diagram of a generating circuit for the starting pulses used in the operation of the pulse pick-out device according to the invention.

The starting pulses applied at J and the reset pulses applied at terminal K can be produced, preferably by an arrangement as illustrated in FIGURE 7. In this arrangement a conventional triode 306 is connected with its cathode to 0 potential and with its plate via resister 313 to positive potential. The negative grid bias voltage is tapped from resisters 307, 308 of a voltage divider which is connected to 0 potential on the one hand and negative potential on the other hand. Resister 307 may be shunted off by closing a circuit-make switch 309, whereby the grid 310 of triode 306 is connected to 0 potential via the resister 312. Thereby, triode 306 becomes conductive and a negative pulse is produced at exit terminal 311. Switch 309 may be actuated manually, or by a flip-flop circuit, a relay, or a similar actuating means.

The pulse pick-out arrangement according to my invention can be used as an auxiliary device for electrical accounting or computing machines and the like, which machines process data in the form of electric pulses by making available, at predetermined times, selectively determinable pulse groups serving to start or control the individual operations of these machines.

What I claim is:

1. A gating circuit arrangement for selectively picking out groups of pulses from a continuous sequence of clock pulses in which the pickout operations are synchronized with the aforesaid clock pulses, comprising gate means, means coupling the input of a clock pulse sequence into said gate means, a first and second "and" circuit means; an electrically reversible two-state switching system interposed between said first and said second "and" circuit means; means coupling the input of a switching pulse sequence simultaneously into said first and said second "and" circuit means, the intervals between the switching pulses being at least equal to those between said clock pulses; a delaying circuit interposed between said reversible switching system and said second "and" circuit means; means for introducing a starting pulse into said first "and" circuit means via said reversible switching system; said gate means being connected to said first and said second "and" circuit means via said reversible switching system; said delaying circuit being adapted for delaying the rise of potential in said second "and" circuit means so that a first of said switching pulses is permitted to pass only through said first "and" circuit when said starting pulse opens passage therethrough, and said delaying circuit being further adapted for integratingly delaying the next following switching pulse passing through said second "and" circuit so that the delayed switching pulse reverses the reversible switching system to its original state, thereby interrupting passage of said clock pulses through said gate means.

2. A gating circuit as described in claim 1, wherein said delaying circuit comprises a first capacitor adapted for delaying the rise in potential caused by the first switching pulse in said second "and" circuit, and a second capacitor adapted for integratingly delaying the next following switching pulse-passing through said second "and" circuit.

3. A gating circuit arrangement as described in claim 1, wherein the entrance of said second "and" circuit means associated with said delaying circuit is connected to the output potential of said reversible switching means, said delaying circuit being electrically so dimensioned that the output potential of said reversible switching means opening passage of clock pulses through said gate means becomes effective in the second "and" circuit means only after a delay being at least equal to the duration of the starting pulse, thereby becoming effective in the time interval between said first gate opening switching pulse and the next following switching pulse of said switching pulse sequence.

4. A gating circuit arrangement as described in claim 1, wherein means are provided for introducing a resetting pulse into the circuit of said reversible switching system so as to reset the same to an opposite state, and wherein the entrance of said first "and" circuit means is connected to the reversible switching means in such a manner that the starting pulse and the resetting pulse are converted without delay in time to control potentials for said first "and" circuit means.

5. A gating circuit arrangement as described in claim 1, wherein said reversible switching system comprises a first and second two-state reversible member, and at least one rectifier pair interposed therebetween, and wherein said delaying circuit comprises a delaying and integrating phase inverter, said first and said second two-state reversible members being connected to the output of said second "and" circuit means via said phase inverter and said rectifier pair, in such a manner that an output pulse from said second "and" circuit means simultaneously (a) resets said first reversible switching member as well as the first "and" circuit means to starting conditions, thereby interrupting via said second reversible switching member the passage of clock pulses through said gate means, and (b) blocks the entrances to the first "and" circuit so that a new clock pulse group can only be picked out after a new starting pulse has been applied thereto.

6. An electric circuit arrangement for selectively picking out groups of pulses from a continuous sequence of clock pulses, comprising: a first, second, third gate having first, second, third output terminal, respectively, first, second, third input terminal, respectively, and first, second, third gating terminal, respectively; means for applying a first sequence of pulses to said first input terminal; means for applying a second sequence of pulses having a smaller frequency of occurrence than said first sequence to said second and said third input terminal; a voltage delaying means; a control means having two control terminals connected to said second and third output terminals, respectively, further having a control output terminal connected directly to said first gating terminal, said control output terminal being further connected via said voltage delaying means to said third gating terminal; and means for applying an enabling voltage to said second gating terminal.

7. An electric circuit arrangement for selectively picking out groups of pulses from a continuous sequence of clock pulses comprising; a first gate having two input terminals, one of them being supplied with said clock pulses, and having an output terminal from which the groups of pulses are taken; a reversible element having two input terminals and having an output terminal connected to the other input terminal of said first gate for opening said first gate; a second gate having two input terminals and having an output terminal connected to one input terminal of said reversible element whereby said first gate is opened when an output appears at said second gate; a third gate having two input terminals and having an output terminal; means for applying switching pulses having a predetermined relationship to said clock pulses, to one input terminal of said second gate and to the other input terminal of said third gate; first circuit means interconnecting the output terminal of said third gate and the other input terminal of said reversible element, whereby the output of said reversible element is turned off when a switching pulse is permitted to pass said third gate; second circuit means including delay means interconnecting the output terminal of said reversible element and one input terminal of said third gate for delayedly applying thereto the output which also opens said first gate, and enabling means connected to the other input terminal of said second gate for opening it.

8. An electric circuit arrangement for selectively picking out groups of pulses from a continuous sequence of clock pulses comprising: a first gate having two input terminals, one of them being supplied with said clock pulses, and having an output terminal from which the groups of pulses are taken; a reversible element having two input terminals and having an output terminal connected to the other input terminal of said first gate for opening said first gate; a second gate having two input terminals and having an output terminal connected to one input terminal of said reversible element whereby said first gate is opened when an output appears at said second gate; a third gate having two input terminals and having an output terminal; means for applying switching pulses having a predetermined relationship to said clock pulses to one input terminal of said second gate and to the other input terminal of said third gate; first circuit means interconnecting the output terminal of said third gate and the other input terminal of said reversible element, whereby the output of said reversible element is turned off, when a switching pulse is permitted to pass through said third gate; second circuit means including a capacitor interconnecting the output terminal of said reversible element and one input terminal of said third gate so as to apply said output thereto thereby delayedly opening said third gate as compared with the opening of said first gate; a second reversible element having one output terminal and two input terminals, the output terminal thereof being connected to the other input terminal of said second gate, one input terminal of said second reversible element being supplied by starting pulses so that this element produces an output for opening said second gate upon occurrence of a starting pulse, and circuit means interconnecting the output terminal of said third gate and the other input terminal of said second reversible element so as to erase the effect of a starting pulse therein when a switching pulse is gated through said third gate the latter being opened by the output as delayedly applied to said third gate from said first reversible element.

9. An electric circuit arrangement for selectively picking out groups of pulses from a continuance sequence of clock pulses comprising: a first gate having two input terminals, one of them being supplied with said clock pulses and having an output terminal from which groups of pulses are taken; a reversible element having two input terminals and having an output terminal connected to the other input terminal of said first gate for opening said first gate; a second gate having two input terminals and having an output terminal connected to one input terminal of said reversible element whereby said first gate is opened when an output appears at said second gate; a third gate having two input terminals and having an output terminal; means for applying switching pulses having a predetermined relationship to said clock pulses to one input terminal of said second gate and to the other input terminal of said third gate; first circuit means interconnecting the output terminal of said third gate and the other input terminal of said reversible element, whereby the output of said reversible element is turned off when a switching pulse is permitted to pass said third gate; second circuit means including a delaying means interconnecting the output terminal of said reversible element and one input terminal of said third gate, and enabling means interconnecting the output terminal of said third gate and the other input terminal of said second gate and including a trigger circuit for opening said second gate until said third gate produces an output in response to a switching pulse.

10. An electric circuit arrangement for selectively picking out groups of pulses from a continuous sequence of clock pulses comprising: a first logic "and" circuit, having two input terminals, one of them being supplied with said clock pulses and having an output terminal from which groups of pulses are taken; a flip flop circuit having two input terminals and having an output terminal connected to the other input terminal of said first "and" circuit; a second logic "and" circuit having two input terminals and having an output terminal connected to one input terminal of said flip flop whereby said first "and" circuit permits the passage of lock pulses when an output appears at said second "and" circuit; a third logic "and" circuit having two input terminals and having an output terminal; means for applying switching pulses having a predetermined relationship to said clock pulses to one input terminal of said second "and" circuit and to the other input terminal of said third "and" circuit; an integrating circuit interconnecting the output terminal of said third "and" circuit and the other input terminal of said flip flop; a capacitor circuit interconnecting the output terminal of said flip flop and one input terminal of said third "and" circuit, and enabling means including a second flip flop interconnecting the output terminal of said third "and" circuit and the other input terminal of said second "and" circuit; said second flip flop being adapted for opening said second "and" circuit until said third "and" circuit produces an output in response to a switching pulse.

References Cited in the file of this patent

UNITED STATES PATENTS

| | | |
|---|---|---|
| 2,796,596 | Kenosian | June 18, 1957 |
| 2,796,597 | Poorte et al. | June 18, 1957 |
| 2,803,003 | Alrich | Sept. 17, 1957 |

FOREIGN PATENTS

| | | |
|---|---|---|
| 767,685 | Great Britain | Feb. 6, 1957 |